United States Patent [19]
Lang et al.

[11] Patent Number: 5,345,378
[45] Date of Patent: Sep. 6, 1994

[54] METHOD AND APPARATUS FOR OPERATING A PROGRAMMABLE CONTROLLER FOR CONTROLLING A TECHNICAL PROCESS

[75] Inventors: Georg Lang, Sulzbach-Rosenberg; Georg Trummer, Vilseck; Edgar Sigwart, Amberg; Werner Fraas, Amberg; Andrea Misler, Amberg; Gerhard Reinert, Schwandorf, all of Fed. Rep. of Germany

[73] Assignee: Siemens Aktiengesellschaft, Munich, Fed. Rep. of Germany

[21] Appl. No.: 905,807

[22] Filed: Jun. 29, 1992

[30] Foreign Application Priority Data

Jun. 28, 1991 [EP]  European Pat. Off. ........ 91110763.9

[51] Int. Cl.⁵ .............................................. G05B 11/01
[52] U.S. Cl. .................. 364/140; 364/926.93; 364/949; 364/DIG. 2
[58] Field of Search .................. 364/131–143, 364/474.11, 926.93, 949, 947.2, 946.2

[56] References Cited

U.S. PATENT DOCUMENTS

| 4,658,356 | 4/1987 | Shiozaki et al. ............... 364/200 |
| 4,858,101 | 8/1989 | Stewart et al. ................ 364/131 |
| 4,916,600 | 4/1990 | Ropelato ....................... 364/131 |
| 4,956,785 | 9/1990 | Kawamura et al. ............. 364/133 |
| 5,042,002 | 8/1991 | Zink et al. ................. 364/926.93 |
| 5,068,778 | 11/1991 | Kosem et al. ................. 364/131 |
| 5,164,894 | 11/1992 | Cunningham-Reid et al. .... 364/131 |

FOREIGN PATENT DOCUMENTS

| 0082722 | 6/1983 | European Pat. Off. . |
| 0298396 | 1/1988 | European Pat. Off. . |
| 2033624 | 5/1980 | United Kingdom . |

Primary Examiner—Jerry Smith
Assistant Examiner—Jim Trammell
Attorney, Agent, or Firm—Kenyon & Kenyon

[57] ABSTRACT

One cycle of a programmable controller includes reading-in (E) the input signals, processing (B) the input signals, whereby inter alia the output signals are calculated, and outputting (A) the output signals. The time one cycle takes can be shortened by processing (B) the input signals at least in part simultaneously with the outputting (A) of the output signals of the preceding cycle and with the reading-in (E) of the input signals of the subsequent cycle.

26 Claims, 4 Drawing Sheets

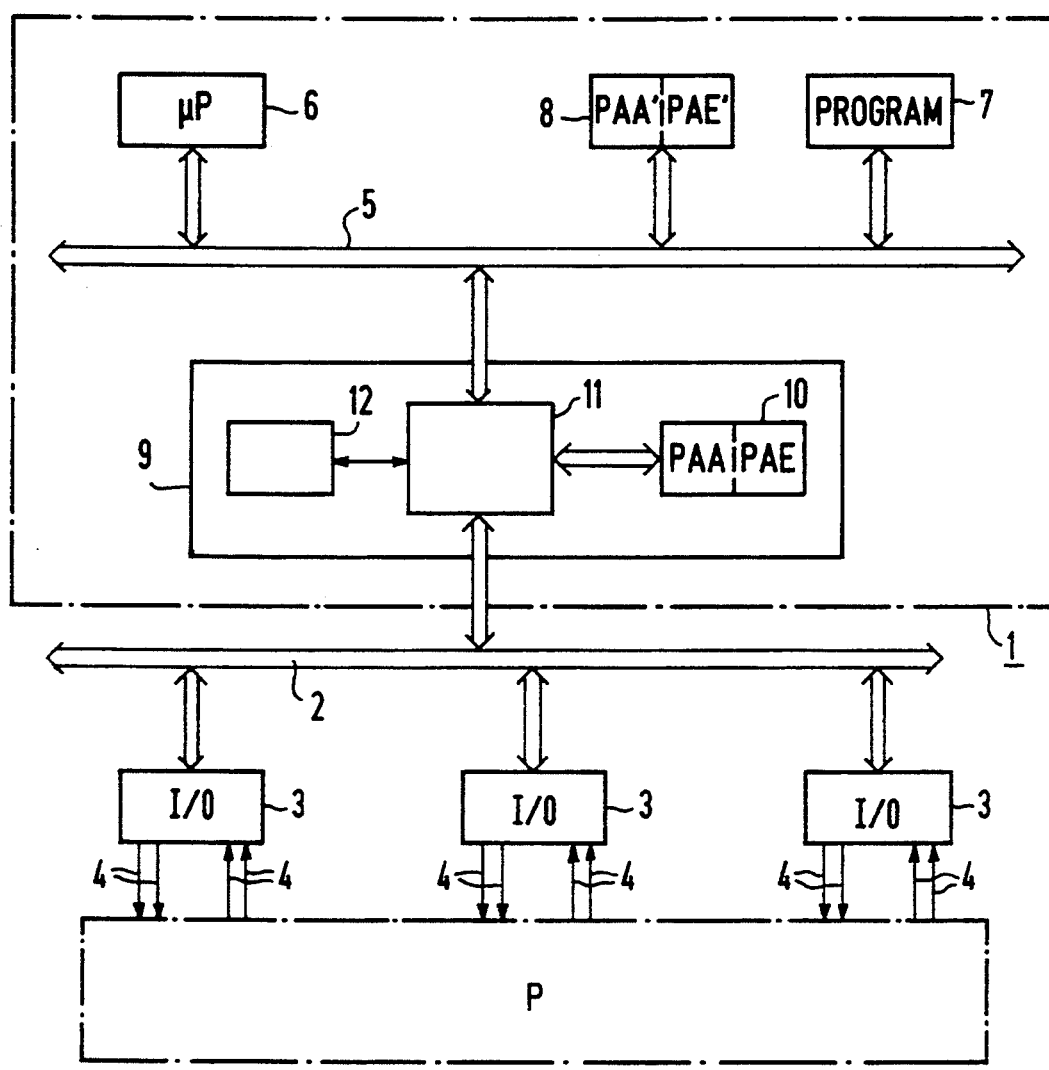
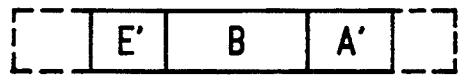
FIG 2

/* METHOD AND APPARATUS FOR OPERATING A PROGRAMMABLE CONTROLLER FOR CONTROLLING A TECHNICAL PROCESS

BACKGROUND OF THE INVENTION

The present invention relates to a method for operating a programmable controller for controlling a technical process and, in particular a modular programmable controller having a process interface system linked to it, comprising the following cyclically executed steps:
a) reading into the programmable controller input signals supplied by the process interface system;
b) processing the input signals, thereby determining output signals for the process interface system; and
c) transmitting the output signals to the process interface system.

Conventional process control methods executed the above-mentioned steps sequentially. The time taken for one run-through of the steps is the so-called cycle time. In particular, when large data sets need to be input and output, the cycle time, and thus the reaction time of the system are determined not only by processing speed, but also by the duration of the data transfer.

SUMMARY OF THE INVENTION

The present invention improves the cycle time by processing the input signals of one cycle at, least in part, simultaneously with the outputting of the output signals of the preceding cycle and, at least in part, simultaneously with the reading in of input signals of the subsequent cycle. To this end, before the input signals of one cycle are processed, the output signals of the preceding cycle are advantageously copied from a working storage into a buffer storage, and the input signals of the cycle are copied from the buffer storage into the working storage, so that the input signals of the subsequent cycle and the output signals of the preceding cycle are not altered as a result of the processing.

A particularly efficient operation results when
  after the output signals of a first cycle have been copied into a buffer storage and the input signals of a second cycle have been read into the buffer storage output signals are provided to the process interface system, and the input signals are copied into a working storage;
  the input signals of said second cycle stored in the working storage are processed;
  output signals of the second cycle are copied into the buffer storage after the input signals of said second cycle are processed and the output signals of said first cycle are provided to the output interface from the buffer storage; and
  the input signals of a third cycle are read into the buffer storage after the output signals of said first cycle have been output and the input signals of said second cycle have been copied into said working storage;
  each process step is advantageously begun immediately upon reaching its acceptability conditions.

The cycle time can be shortened still further if the output signals of the first cycle are output to the process interface system, at least in part, while the input signals of the second cycle are copied into the working storage and/or the input signals of the third cycle from the process interface system are read in, at least in part, while the output signals of said second cycle are copied into the buffer storage.

Another possibility for simultaneously implementing input/output and processing includes steps of:
  reading input signals out of a working storage during the processing of these input signals of one cycle, and filing the output signals determined during the processing in the working storage;
  reading the output signals of the preceding cycle out of a buffer storage during the output operation and reading the input signals of the subsequent cycle into the buffer storage during the read-in operation; and
  after these steps are completed, swapping the functions of the working storage and the buffer storage so that after the function swap, the previous working storage acts as a buffer storage and the previous buffer storage acts as a working storage.

If only those signals whose value has changed compared to the value of the preceding output are output during the outputting of the output signals, the amount of the data to be transmitted can be considerably reduced and thus the cycle time can be further shortened. However, all output signals should be output after a preselectable number of cycles to test the line. The same applies analogously to input signals.

A programmable controller for controlling a technical process according to a method as provided by the present invention includes the following elements:
  at least one processor for processing input signals supplied by a process interface system;
  at least one input and one output unit, preferably a combined input/output unit, for reading in the input signals and for outputting the output signals to the process interface system;
  a working storage for storing the input signals and the output signals;
  a buffer storage for temporarily storing the input and the output signals; and
  an input/output controller for reading in the input signals from the process interface system and for outputting the output signals to the process interface system.

Providing the buffer storage with a storage area for storing change indicators, and providing the programmable controller with a counter for counting the cycles permits the programmable controller to advantageously minimize data transfer.

The resources required to copy the output signals into a buffer storage and the input signals into a working storage can be minimized when the working storage and the buffer storage have the same design and when both the processor and the controller can access both the working storage and the buffer storage.

BRIEF DESCRIPTION OF THE DRAWINGS

Further advantages and details are revealed in the following description of an exemplified embodiment, based on the drawings and in conjunction with the additional dependent claims.

FIG. 1 is a block diagram illustrating a programmable controller which can execute a method according to an embodiment of the present invention.

FIG. 2 is a flow chart of a single cycle in accordance with an embodiment of the present invention.

DETAILED DESCRIPTION

Figure 3:
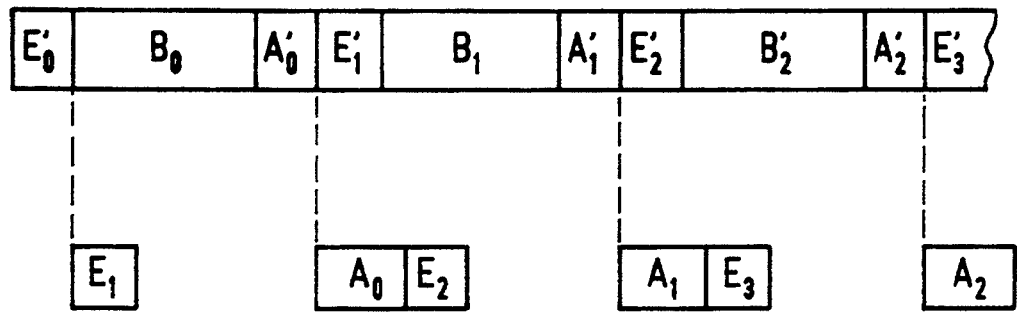
FIGS. 3 to 6 show examples of typical program execution schemata according to an embodiment the present invention.

According to FIG. 1, a central processing unit 1 of a programmable controller of a modular design is linked via bus 2 to modules 3 which can be input modules, output modules, or combined input/output modules, both for digital as well as for analog data input/output. The modules 3 are connected via lines 4 to process control elements (not shown), for example final controlling elements or sensors. The process P is controlled and monitored through the process control elements.

As is furthermore apparent from FIG. 1, the central processing unit 1 has an internal bus 5, to which the following components are linked:
- a program storage 7;
- a microprocessor 6, which executes a program stored in the program storage 7;
- a working storage 8; and
- an input/output controller 9.

Internally, the input/output controller 9 has a buffer storage 10, a component 11 having internal logic, and a counter 12 for counting cycles. The component 11 can be a complete processor, for example, but can also be an application specific integrated circuit (ASIC). Both the working storage 8, as well as the buffer storage 10, can consist of several partial storage units, for example only for the input signals and the output signals.

The internal bus 5 is essentially completely independent of the external bus 2. As a result, it is possible to use a newly developed central processing unit 1 with an internal bus 5 of, for example, a 32-bit data capacity without developing a completely new backplane bus system even when the external bus 2 has a lower data capacity such as 8 bits.

To control and monitor the technical process indicated in FIG. 1 by the symbol P, input signals are cyclically supplied by the process interface system (not shown), from all types of sensors, and are read into the programmable controller. The input signals are then processed. The output signals for the process interface system to be supplied to all types of final controlling elements, are determined based on the input signals. Further, status messages and alarm indications may be output to the user. The output signals are output to the process interface system. For this purpose, the following steps are carried out.

1) Input signals from the process interface system are applied to the modules 3, accepted and temporarily stored there 2) The input signals are read as the process image PAE of the inputs into the storage 10 by the controller 9 (this step is denoted by the symbol E)

3) The process image PAE is retrieved by the processor 6 from the buffer storage 10 and filed as the process image PAE' of the inputs in the working storage 8 (this step is denoted by the symbol E')

4) The processor 6 calculates the process image PAA' of the outputs from the input signals, as well as possible additional variables while executing the program stored in the storage 7, and then files this process image PAA' in the working storage 8 (this step is designated by the symbol B)

5) The processor 6 copies the process image PAA' of the outputs from the working storage 8 into the buffer storage 10 as data PAA (this step is designated by the symbol A')

6) The component 11 reads process image PAA from the buffer storage and sends it to the modules 3 via the bus 2 (this step is designated by the symbol A); and 7) The modules 3 output the output signals to the final controlling elements and thereby control the process P in the desired manner.

Of the above seven steps, the first and the last are carried out in a generally known way. Therefore, no more details will be given about these steps in the following.

FIG. 2 depicts the chronological sequence of steps E, E', B, A' and A of one cycle. The present invention utilizes the times when the processor 6 or the controller 9 are idle. For example, the controller 9 may carry out step E for the next cycle before step A of the present cycle is performed. In this manner, the processor 6 can continue processing with step E' of the next cycle (transfer of input from buffer storage 10 to working storage 8) immediately after the completion of step A' (transfer of output from working storage 8 to the buffer storage 10). This is indicated by the small box drawn with a dotted line to the right. In the same way, the controller 9 can execute step A of the preceding cycle during its idle time between steps E and A for the present cycle, so that also step A' of the preceding cycle can directly adjoin step E', as indicated by the small box drawn with a dotted line to the left.

Since steps E' and A' take up considerably less time than steps E and A, this procedure is especially advantageous because the data transfer via the internal bus 5 takes place considerably faster than via bus 2. Thus, the larger of the two following values results as the cycle time:
- the sum of the execution times for steps E', B, and A'; or
- the sum of the execution times for steps E and A.

This contrasts with a conventional execution method where the cycle time would be the sum of the execution times for steps E, B and A.

In the present invention, steps E, E' as well as A, A' must not be allowed to overlap temporally, otherwise inconsistencies could arise in the data. On the other hand, steps E and A' as well as A and E' can overlap temporally. This fact is used advantageously in the following to further shorten the cycle time.

Figure 4:
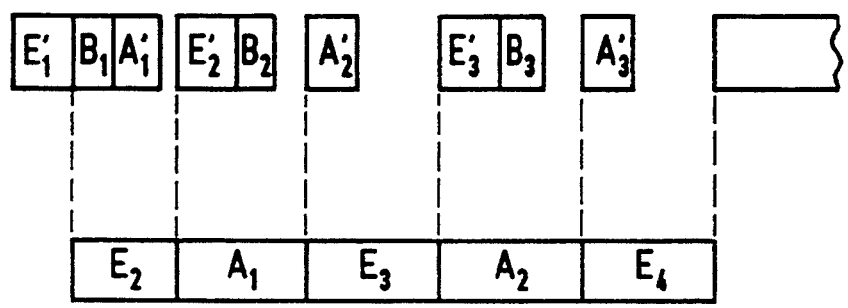
Figure 5:
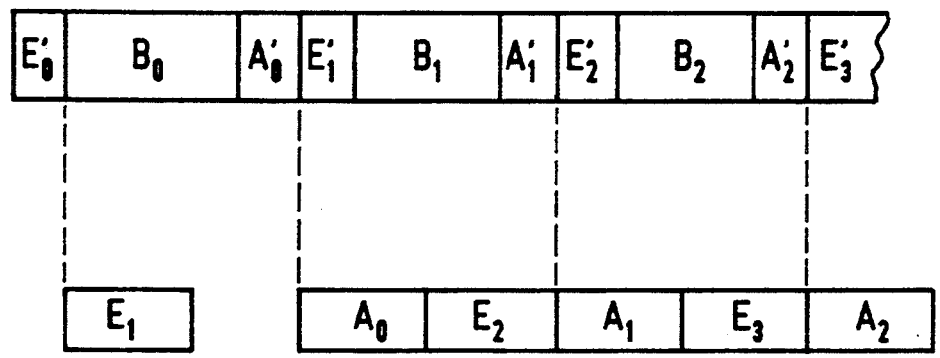

FIGS. 3 to 5 show various processing examples which are possible depending on the length of the program to be executed and the scope of the data transfer. The same subscripts refer to the same cycle.

In the process according to FIGS. 3 to 5, steps E and A are carried out only once per cycle, whereby each of the five process steps begins immediately after reaching its acceptability conditions. On the other hand, in the process according to FIG. 6, steps A and E are continuously executed until the process step B is complete. The processor 6 then waits until the currently running or, in case step A was just carried out, the next step E is complete, before executing steps A' and E'. As soon as the processor 6 continues with the next step B, the controller 9 again begins with steps A and E. This procedure is advantageous because the processor 6 always has available "fresh" input signals, while in the procedure referring to FIGS. 3–5 described above, (compare in particular FIG. 3), the last read-in operation can already have taken place some time ago. However, the cycle time of the process according to FIG. 6 is not quite as optimal as the former process.

Figure 6:
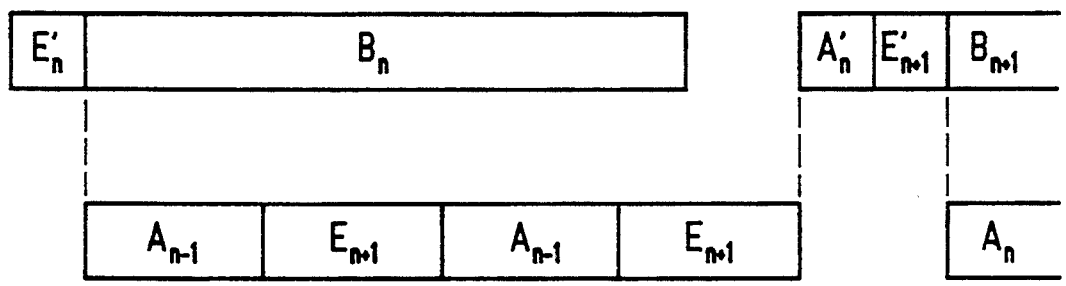

According to FIG. 6, step $B_{n+1}$ begins at the same time as step $A_n$. At the earliest, step $A_n$ could begin after step $A'_n$ is complete, however, it is easier to realize the procedure depicted in FIG. 6. In addition, the process can be optimized even further when only the read-in operation $E_n$ is executed again and again, while the output operation $A_n$ is executed only the first time.

Figure 7:
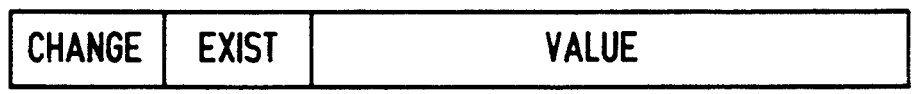
FIG. 7 depicts a principle of data management in the buffer storage.

FIG. 7 illustrates the organization of the dataword of the buffer storage 10 of the controller 9. Each input or output signal has a definite value, which is stored in the value storage area of a data word. Furthermore, each data word also has two bits, exist and change, which serve to further optimize steps E and A timewise. In a well known way, a bit corresponding to whether the input or output that correlates with the data word exists at all in or rather is linked to the particular configuration of the programmable controller is stored in the exist bit. In addition, a bit corresponding to whether the value of the data word has changed since the last input or output is stored in the change bit. Before the controller 9 emits the output signals or reads in the input signals, it checks if the signal in question exists at all and whether it has changed since the last output or since the last read-in operation based on the exist bit and the change bit. Only the changes are output by the controller 9 to the modules 3 or read in by the modules 3. As a result, the time required to execute steps E and A can be considerably reduced.

To test the lines of the bus 2, all existing signals (not only those signals that have changed), are transmitted after a preselectable number of cycles. The number of cycles is typically in the range of from 10 to 1000, preferably around 100. When the preselected number of cycles since the last complete data transfer is reached, the counter 12 signals the component 11, which, as a result, queries all existing input/outputs (not only those whose value has changed) during the next data transfer A, E. The counter 12 is then reset.

As far as the output signals are concerned, monitoring any change in the signals is particularly simple because all necessary information is available within the central processing unit 1 and is automatically transmitted to the controller 9 when the process image PAA' is copied into the buffer storage 10. When the change transfer is made only for the output signals, while the input signals are always read in completely, the buffer storage has to exhibit the change bits only for the output values, not on the other hand for the input signals.

Several possibilities for reading in only those input signals whose value has changed from the preceding read-in operation exist. One possibility is to initially read the input signals into the input units 3, to compare them there to the data last transmitted to the central processing unit 1, and then to signal to the central processing unit 1, for example by means of an interrupt, that an input signal has changed. As a result of this status message, the I/O controller 9 is then able to selectively read in only changed input signals. Another possibility is to enable the input units 3 to access the bus 2 themselves, so that the input units 3 actively sending the modified data to the controller 9 retrieve the data rather than the controller 9.

To compare the data read at a given moment to the previously read data, the units 3 must possess a minimum storage capacity for intermediately storing the last input signals read in, as well as a logic for comparing the newly reading input signals to the input signals read in last and must be able to actively access the bus 2, at least by emitting an interrupt signal.

The number of input signals to be transmitted can be reduced still further when the input signals are read into the input units 3 only when a read-in command sent out by the central processing unit 1 is present. Therefore, only the signal values last and currently read into the input units 3 decide if the input signal in question must be transmitted rather than interim fluctuations. The read-in command is advantageously transmitted immediately after an output operation A is complete.

Figure 8:
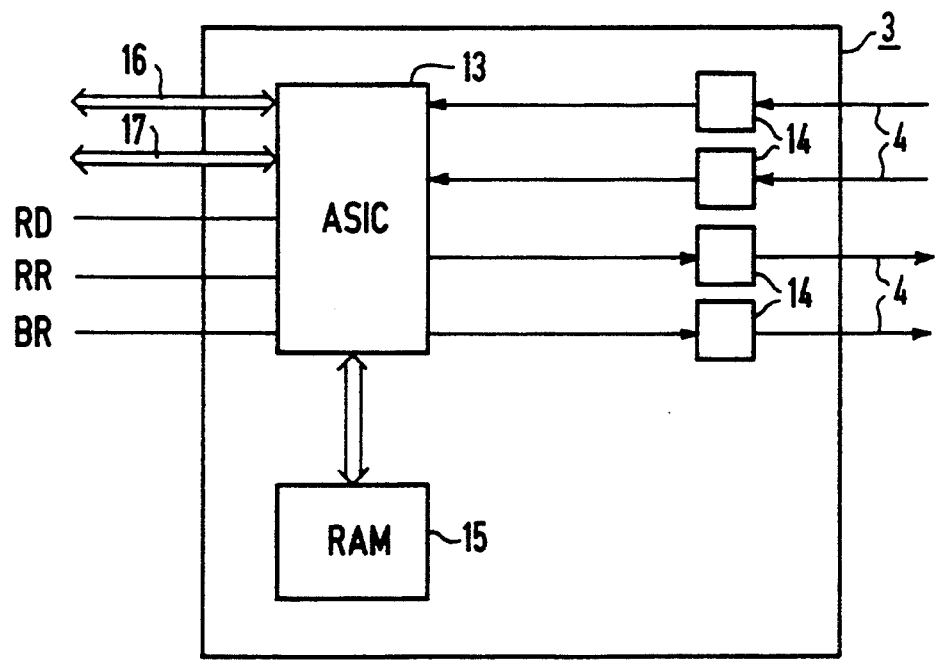
FIG. 8 is another block diagram illustrating a second embodiment of a programmable controller which can execute the method of the present invention.

FIG. 8 depicts such a module 3. The module 3 exhibits an application specific integrated circuit 13 which, for example, enables the latches 14 and, thus, reads in the input signals applied to the lines 4 based on a "read data" command transmitted via the control line RD. The ASIC 13 then compares the newly read-in data to the data stored in the storage 15, which had been read in during the preceding read-in operation, and notes which input signals have changed. This comparison preferably takes place in the same manner as the comparison of the output signals, in the controller 9. When input signals have changed the ASIC 13 can transmit a "read request" via the control line RR to the central processing unit 1 signifying that input signals are to be read from the module 3 into the central processing unit. In this example, the data are read out of the module 3 by the controller 9. Therefore, except for transmitting the read-out request, the module 3 is purely a passive component, as well as a storage module. In much the same way, the system may be configured so that the module 3 may request the allocation of the bus 2 via the line BR through the command "bus request". Therefore, the module 3 can actively transmit its data via the address bus 16 and the data bus 17 to the controller 9.

The same procedure, namely the transfer of values only in the case of a change, is in principle also possible for steps E' and A'. However, this is not normally necessary, because steps E', A' take relatively little time.

Figure 9:
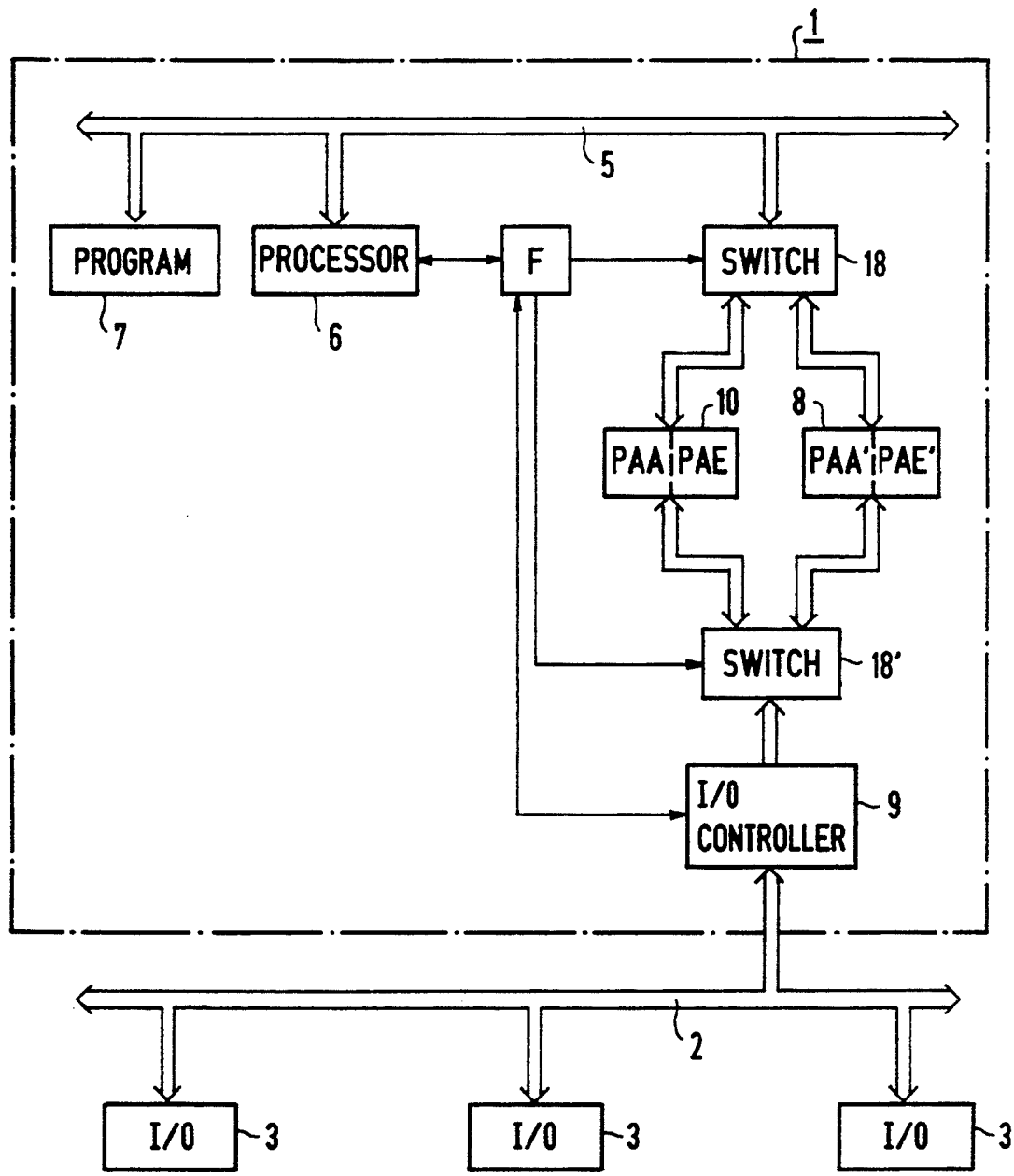
FIG. 9 is a block diagram depicting the structure of an intelligent input/output module which may be used in an embodiment of the present invention.

A further possible development of the design of the central processing unit 1 depicted in FIG. 1 is shown in FIG. 9. Here, the buffer storage 10 is not a component of the controller 9, but rather is configured on the central processing unit on a par with the working storage 8. Access to the storage 8, 10 follows from bus 2, is via a switch 18'. Access to the storage 8, 10 follows from bus 5 via a switch 18. Therefore, process images no longer have to be copied from the working storage 8 into the buffer storage 10 and vice versa. At a certain instant, the processor 6 accesses only the working storage 8 via the switch 18, independent of what happens to the buffer storage 10. At the same instant, the controller 9 can only access the buffer storage 10 via the switch 18'. When the processor 6 and the controller 9 have executed their programs and a new copying operation A', E' would have to follow, only the flag F is set or reset, whereupon the switches 18, 18' switch over. From the moment of the switch-over on, the processor 6 can only access the original buffer storage 10, which now functions as a working storage, via the switch 18 and, conversely, the controller 9 can only access the former working storage 8, which now functions as a buffer storage. As a result, the times, required in the configuration according to FIG. 1 for steps E' and A', are virtually reduced to zero, namely the switch over time for the flag F and the switches 18, 18'.

To realize such a system, the storages 8 and 10 must have the same design. Furthermore, at least the switches 18, 18' should have tri-state buffers, so that, for example, the switches 18 accessing of the storage 8 does not disturb the switches 18' accessing of the storage 10 and vice versa. In the same way, however, designing the storages 8 and 10 as dual-port RAMs is also possible.

The switching over of the switches 18, 18' can also take place via the processor 6, instead of via the flag F, when this processor receives corresponding status information from the controller 9.

What is claimed is:

1. A method of operating a programmable controller for controlling a technical process with a process interface system linked to the programmable controller, comprising the following cyclically executed steps:
   reading input signals supplied by the process interface system into the programmable controller;
   processing the input signals to thereby determine output signals for the process interface system from the input signals; and
   outputting the output signals to the process interface system,
   wherein the processing of the input signals of one cycle takes place, at least in part, simultaneously with the outputting of the output signals of the preceding cycle and with the reading in of the input signals of the subsequent cycle, and
   wherein the outputting of the output signals of the preceding cycle takes place at a different time than the inputting of the input signals of the subsequent cycle.

2. The method of claim 1 wherein said programmable controller is of a modular design.

3. The method of claim 1, further comprising the step of:
   copying the output signals of a preceding cycle from a working storage into a buffer storage, and copying the input signals of a present cycle from said buffer storage into said working storage before the processing of the input signals of said present cycle, so that the input signals of a subsequent cycle and the output signals of the preceding cycle are not changed as the result of the processing of the present cycle.

4. The method of claim 3, wherein the reading in of the input signals of the subsequent cycle takes place only after the outputting of the output signals of the preceding cycle.

5. The method of claim 3, further comprising steps of:
   repeatedly reading in at least one of the input signals of the next cycle during the processing of the input signals of one cycle;
   after the processing of the input signals of one cycle is complete, waiting for the completion of the read-in operation running at the moment, or when no read-in operation is running, waiting for the next read-in operation; and
   copying the output signals of the cycle into the buffer storage and copying the input signals of the next cycle into the working storage after completion of the read-in operation, wherein the output signals are output to the process interface system after the copying of the output signals of the cycle into the buffer storage.

6. The method of claim 3, further comprising steps of:
   outputting the output signals to the process interface system, and copying the input signals into the working storage after the copying of the output signals of one cycle into the buffer storage and the reading-in of the input signals are processed after the copying of the input signals into the working storage;
   copying the output signals into the buffer storage after the processing of the input signals and the outputting of the output signals of the preceding cycle; and
   reading the input signals of the next cycle into the buffer storage after the outputting of the output signal sand the copying of the input signals.

7. The method of claim 6, wherein each process step is initiated immediately upon reaching its acceptability conditions.

8. The method of claim 3, wherein the outputting of the output signals to the process interface system takes place, at least in part, during the copying of the input signals into the working storage.

9. The method of claim 3, wherein the reading-in of the input signals from the process interface system takes place, at least in part, during the copying of the output signals into the buffer storage.

10. The method of claim 1, wherein the reading in of the input signals of the subsequent cycle takes place only after the outputting of the output signals of the preceding cycle.

11. The method of claim 10, further comprising steps of:
   repeatedly reading in at least one of the input signals of the next cycle during the processing of the input signal of one cycle;
   after the processing of the input signals of one cycle is complete, waiting for the completion of the read-in operation running at the moment, or when no read-in operation is running, waiting for the next read-in operation; and
   copying the output signals of the cycle into the buffer storage and copying the input signals of the next cycle into the working storage after completion of the read-in operation
   wherein the output signals are output to the process interface system after the copying of the output signals of the cycle into the buffer storage.

12. The method of claim 10, further comprising steps of:
   outputting the output signals to the process interface system, and copying the input signals into the working storage after the copying of the output signals of one cycle into the buffer storage and the reading-in of the input signals of the next cycle into the buffer storage;
   said input signals are processed after the copying of the input signals into the working storage;
   copying the output signals into the buffer storage after the processing of the input signals and the outputting of the output signals of the preceding cycle; and
   reading the input signals of the next cycle into the buffer storage after the outputting of the output signals and the copying of the input signals.

13. The method of claim 12, wherein each process step is initiated immediately upon reaching its acceptability conditions.

14. The method of claim 1, further including steps of:

reading input signals out of a working storage during the processing of the input signals of one cycle;

filing the output signals determined during the processing in the working storage;

reading the output signals of the preceding cycle out of a buffer storage during an outputting of output signals;

reading the input signals of the subsequent cycle into the buffer storage during a reading in of the input signals; and swapping the functions of the working storage and the buffer storage after the above steps are completed, so that after the function swap, the previous working storage functions as a buffer storage and the previous buffer storage functions as a working storage.

15. The method of claim 1 further comprising steps of:

comparing the preceding output value with the present output value; and determining whether the output value changed; wherein the outputting of the output value step is only performed if the output value has changed.

16. The method of claim 15, further comprising a step of:

performing a line test by outputting all output signals, in each case, after a preselectable number of cycles.

17. The method of claim 1 further comprising steps of:

comparing the preceding input value with the present input value; and determining whether the input value changed;

wherein the input value is only read into the buffer storage if the input value has changed.

18. The method of claim 17, further comprising steps of:

initially reading the input signals into at least one input unit;

comparing the read in input signals to the input signals last read into the buffer storage in the input unit; and signaling each change in the input signals to a central processing unit so that the central processing unit is then able to selectively read in the modified input signals.

19. The method of claim 18 wherein an interrupt performs the step of signalling of each change in the input signals to the central processing unit.

20. The method of claim 18, wherein the input signals are read into the input unit only when a read-in command sent out by the central processing unit is present.

21. The method of claim 18, further comprising a step of:

performing a line test by reading all input signals, in each case, after a preselectable number of cycles.

22. The method of claim 17, further comprising steps of:

initially reading the input signals into at least one input unit;

comparing the input signals read in to the input signals last read into a buffer storage in the input unit, filing any changed input signals in the buffer storage by the input unit.

23. The method of claim 22, wherein the input signals are read into the input unit only when a read-in command sent out by the central processing unit is present.

24. The method of claim 22, further comprising a step of:

performing a line test by reading all input signals, in each case, after a preselectable number of cycles.

25. The method of claim 17, wherein the input signals are read into the input unit only when a read-in command sent by the central processing unit is present.

26. The method of claim 17, further comprising a step of:

performing a line test by reading all input signals, in each case, after a preselectable number of cycles.

* * * * *